US012705547B1

(12) United States Patent
Brown

(10) Patent No.: US 12,705,547 B1
(45) Date of Patent: Aug. 11, 2026

(54) DUAL-TIME-SCALE ADAPTIVE ARCHITECTURE FOR RELIABLE ONLINE LEARNING

(71) Applicant: R. David Brown, Palm Springs, CA (US)

(72) Inventor: R. David Brown, Palm Springs, CA (US)

( * ) Notice: Subject to any disclaimer, the term of this patent is extended or adjusted under 35 U.S.C. 154(b) by 0 days.

(21) Appl. No.: 19/541,883

(22) Filed: Feb. 17, 2026

(51) Int. Cl.
*G06N 20/00* (2019.01)
*G06F 11/14* (2006.01)
*G06F 16/18* (2019.01)

(52) U.S. Cl.
CPC ......... *G06N 20/00* (2019.01); *G06F 11/1433* (2013.01); *G06F 16/1865* (2019.01); *G06F 16/1873* (2019.01)

(58) Field of Classification Search
CPC . G06N 20/00; G06F 16/1873; G06F 16/1865; G06F 11/1433
See application file for complete search history.

(56) References Cited

U.S. PATENT DOCUMENTS

2014/0156575 A1* 6/2014 Sainath .................... G06N 7/01 706/16
2016/0092766 A1* 3/2016 Sainath .................. G06N 3/045 706/20
2021/0406254 A1* 12/2021 Friedman ............ G06F 16/2379
2022/0383126 A1* 12/2022 Chen ...................... G06N 3/084

OTHER PUBLICATIONS

Hu et al., "LoRA: Low-Rank Adaptation of Large Language Models", Oct. 16, 2021, arXiv.com, pp. 1-26 (Year: 2021).*
Marszalek et al., "Minimal Ranks, Maximum Confidence: Parameter-efficient Uncertainty Quantification for LoRA", Sep. 2, 2025, arXiv.com, pp. 1-12 (Year: 2025).*

* cited by examiner

*Primary Examiner* — Paulinho E Smith
(74) *Attorney, Agent, or Firm* — The Rapacke Law Group, P.A.; Andrew S. Rapacke; Kenneth F. Brooks

(57) ABSTRACT

A computing system operates a machine learning model comprising base parameters and adapter parameters applied as additive low-rank deltas to one or more transformations. The system determines a routing certificate for each request using a scope function and applies only an adapter state keyed to the determined routing certificate during inference. When a supervision signal is received, the system computes a candidate update and evaluates a gating policy that authorizes the commit only when confidence, risk, scope eligibility, and budget conditions are satisfied. Authorized updates are constrained by a projection operator and committed as delta transactions to a versioned transaction log with provenance metadata. The system supports deterministic rollback to any prior adapter version by computing a prefix sum of logged deltas from a baseline adapter state, without modifying the base parameters. Validated adapter states may be promoted as structured hypothesis records linked to adapter versions for durable reuse and audit.

14 Claims, 5 Drawing Sheets

DUAL-TIME-SCALE ADAPTIVE ARCHITECTURE FOR RELIABLE ONLINE LEARNING

TECHNICAL FIELD

The embodiments generally relate to computer-implemented machine learning systems, and more particularly to runtime control architectures that govern parameter updates to a deployed machine learning model during online operation.

BACKGROUND

Deployed machine learning models, including foundation models and large language models, often encounter operating environments where requirements change on timescales of minutes to hours. Organizations may need a deployed model to learn internal conventions, domain-specific schemas, formatting rules, specialized terminology, or user-specific patterns during active operation. These adaptation needs arise across industries including enterprise knowledge management, education, healthcare documentation, financial services, and software engineering.

Conventional fine-tuning approaches update a model's parameters using new training data collected after initial deployment. While effective for periodic retraining, these approaches typically require taking the model offline or running a separate training pipeline, and the resulting parameter changes apply globally across the model. When applied during active operation, conventional fine-tuning can induce catastrophic forgetting, where the model loses previously learned capabilities, or uncontrolled drift, where the model's behavior diverges from its validated baseline in ways that are difficult to predict or detect.

Parameter-efficient adaptation methods, such as adapter modules and low-rank delta techniques, reduce the computational cost of adaptation by training small parameter sets while leaving the majority of model weights unchanged. These methods have demonstrated that large models can be effectively adapted with relatively few trainable parameters. However, in typical deployment patterns, these methods operate within offline training workflows and do not incorporate runtime controls over when, where, or under what conditions parameter modifications may occur during active model operation.

External memory and retrieval-based approaches store new information outside the model's parameters and retrieve relevant records at inference time. These approaches avoid direct parameter modification but can be sensitive to the quality and relevance of stored records, and they do not provide the model with a mechanism to internalize validated behavioral changes as parameter-level adaptations. Rule-based post-processing systems can enforce output constraints but operate after model inference and do not modify the model's learned representations.

Across these conventional approaches, runtime parameter updates to a deployed model generally lack integrated mechanisms for write authorization prior to committing parameter changes, scope containment that isolates learning in one operational context from other contexts, transactional logging of individual parameter updates with sufficient metadata to support deterministic state restoration, and controlled workflows for promoting validated adaptations into durable representations while preserving the ability to revert to prior known-good states.

SUMMARY

This summary is provided to introduce a variety of concepts in a simplified form that is further disclosed in the detailed description of the embodiments. This summary is not intended to identify key or essential inventive concepts of the claimed subject matter, nor is it intended to determine the scope of the claimed subject matter.

In one aspect, a computing system operates a machine learning model comprising base parameters and adapter parameters applied as additive low-rank deltas to one or more transformations of the machine learning model. The system determines a routing certificate for each received request by applying a scope function, and applies only an adapter state keyed to the determined routing certificate during inference. This certificate-based scoping confines adaptation effects to defined context partitions, so that learning performed in one operational context does not affect model behavior in unrelated contexts.

When a supervision signal is available, the system computes a candidate update to the adapter state keyed to the routing certificate and evaluates a gating policy prior to committing the candidate update. The gating policy authorizes the commit only when a confidence measure, a risk measure, a scope eligibility check, and a cumulative drift budget check are each satisfied. When the gating policy does not authorize the commit, the system refrains from modifying the adapter state. When authorized, the system applies a projection operator to constrain the candidate update according to one or more of a norm constraint, a structured sparsity constraint, and a trust region constraint relative to a session baseline, and then commits the constrained update. This mandatory authorization and projection prior to any parameter write addresses the absence of runtime write controls in conventional adaptation approaches.

Each committed update is recorded as a transaction in a versioned transaction log. The transaction record includes the routing certificate, the delta update, and provenance metadata comprising at least a timestamp, a supervision source identifier, confidence and risk measures, and a context hash. The versioned transaction log and a baseline adapter state together enable deterministic restoration of the adapter state to any previously committed version by computing a prefix sum of delta updates from the baseline, without modifying the base parameters. This transactional logging and prefix-sum rollback mechanism provides the ability to revert a deployed model to a prior known-good adapted state, addressing the difficulty of state restoration associated with conventional parameter update approaches.

In another aspect, the system supports controlled promotion of validated adapter states into a hypothesis memory log. The system identifies a validated adapter version based on validation criteria, constructs a structured hypothesis record comprising a learned convention linked to the validated adapter version and provenance metadata from the transaction log, and stores the structured hypothesis record with an activation policy for use in subsequent sessions. The structured hypothesis record enables durable reuse and audit of validated learning without overwriting the base parameters, providing a controlled pathway for promoting ephemeral in-session adaptations into longer-lived knowledge representations.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
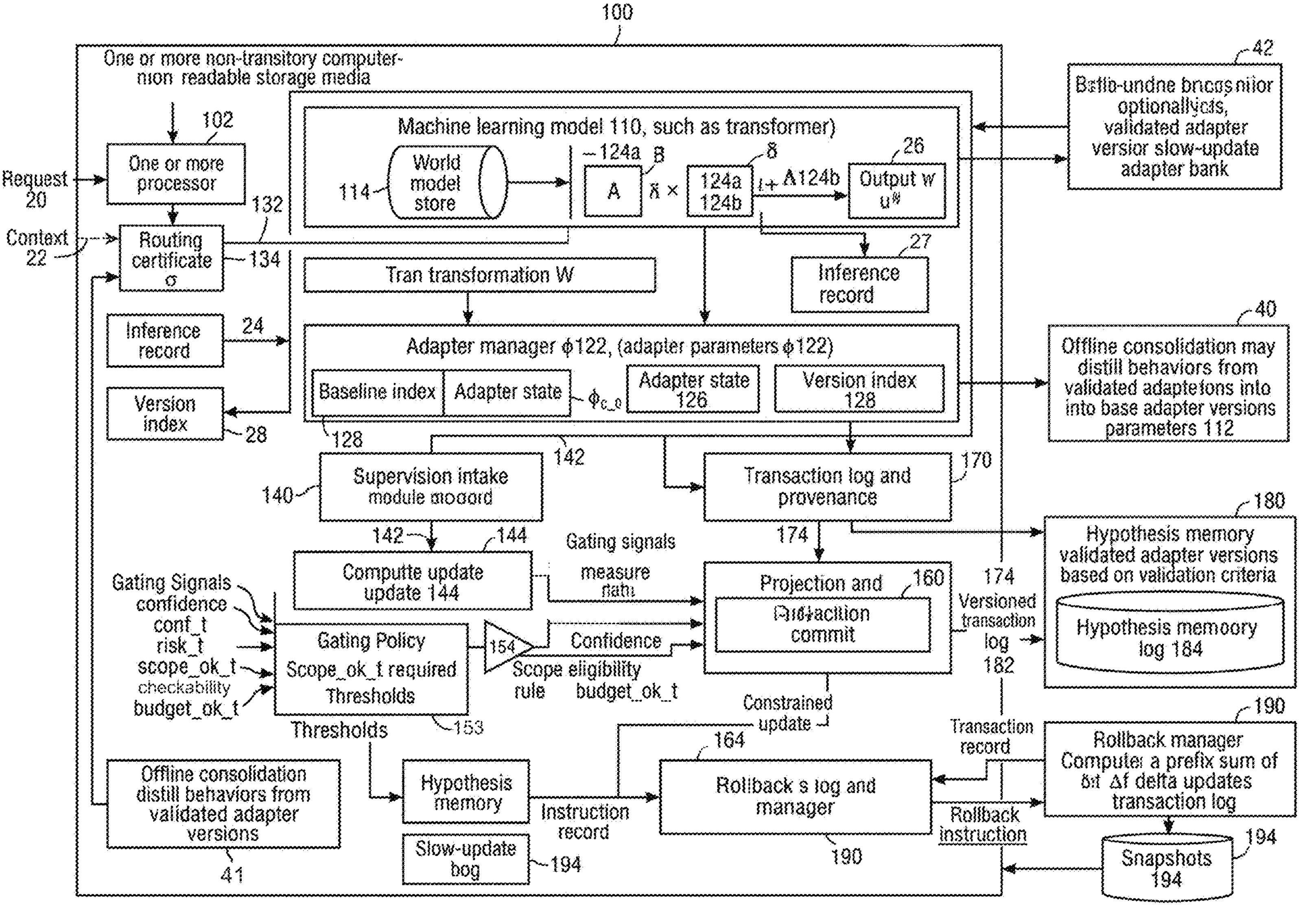
FIG. 1 is a system architecture diagram illustrating a computing system that operates a machine learning model with base parameters and adapter parameters, and that implements certificate-scoped inference, gated update authorization, transactional delta logging with provenance, deterministic rollback, hypothesis memory, and optional offline consolidation.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing exemplary embodiments in detail, it is noted that the embodiments reside primarily in combinations of components related to devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

A computing system comprises one or more processors, one or more non-transitory computer-readable storage media, and optionally one or more hardware accelerators such as graphics processing units, tensor processing units, or neural processing units. The computing system may execute in a cloud environment, an on-premises environment, one or more edge devices, or a hybrid of these. The one or more storage media store instructions that, when executed by the one or more processors, cause the computing system to implement the modules and operations described below.

The computing system operates a machine learning model comprising base parameters theta. The machine learning model may be a transformer encoder-decoder model, a decoder-only language model, a multimodal transformer with a vision encoder, a graph neural network, or another differentiable neural architecture that supports parameter updates and inference. The base parameters theta represent a slow, stable component that is trained conventionally and updated infrequently relative to online updates performed during runtime operation. The computing system stores the base parameters theta in a world model store, which controls access to and update frequency of the base parameters. During normal runtime operation, the base parameters theta remain unmodified.

The computing system further maintains adapter parameters phi that modify one or more transformations within the machine learning model. For a linear transformation W having dimensions d_out by din in the machine learning model, the adapter parameters define an additive low-rank delta DeltaW parameterized as a product of a first factor matrix A having dimensions d_out by r and a second factor matrix B having dimensions r by d_in, where the rank r is significantly smaller than each of d_out and d_in. The adapted transformation produces W_prime equal to W plus DeltaW. Adapters may be applied to attention projection matrices including query, key, value, and output projections, to feed-forward layers, to embedding projection layers, to output projection layers, or to any other linear or affine transformation within the machine learning model. During inference, the computing system may compute the adapted output for an input vector u as the sum of the product W times u and the product A times B times u, thereby avoiding materialization of the full adapted weight matrix W_prime and reducing compute and memory requirements.

The computing system implements an adapter manager module that stores, retrieves, and updates adapter states. Each adapter state is a versioned instance of adapter parameters keyed by at least a routing certificate, described further below. An adapter state may optionally be keyed by a composite key that further includes one or more of a tenant identifier, a user identifier, an application identifier, and a session identifier. An example composite key structure may be expressed as a tuple of tenant identifier, routing certificate, user identifier, and session identifier. For each session and routing certificate, the adapter manager maintains a baseline adapter state phi_c_zero, which represents the adapter parameters at the beginning of the session. The adapter manager also maintains a version index that is incremented each time a new delta update is committed to the adapter state.

The computing system implements a scope and certificate module that determines a routing certificate for each received request. The routing certificate is a discrete identifier representing a context partition. The scope and certificate module applies a scope function sigma to at least one of the request and a context associated with the request and produces the routing certificate as output. The context may include metadata such as an application name, tool permissions, a file type, schema expectations, a user identifier, or a tenant identifier. The routing certificate may encode a domain such as legal, finance, human resources, or engineering; a task type such as summarization, drafting, analysis, or code generation; a tool permission context such as read-only, tool-enabled, or restricted; a compliance regime; or a combination of these as a multi-dimensional tuple stored as a canonical string or integer identifier. The scope function sigma may be implemented as a deterministic rules engine with explicit versioning and deterministic evaluation order, a classifier model that produces discrete labels, a router network that produces discrete labels, or a hybrid system in which rules override classifier outputs. To support deterministic replay and auditability, the computing system logs at least the inputs to the scope function, the routing certificate output, and a version identifier for the scope function implementation, such as a ruleset identifier or classifier model version, for each request.

During inference, the computing system receives a request and determines a routing certificate by applying the scope function. The adapter manager selects the adapter state keyed to the determined routing certificate and applies the corresponding low-rank deltas to the one or more transformations of the machine learning model. Adapter states keyed to routing certificates other than the determined routing certificate are not applied during generation of the output. This certificate-based selection confines the effect of previously learned adaptations to the context partition associated with the routing certificate, so that adaptations learned in one context do not alter model behavior when the model operates under a different routing certificate. The computing system generates an output using the machine learning model with the base parameters and the selected adapter state, and may log an inference record that includes the routing certificate and the current adapter version index.

The computing system implements a supervision intake module that collects supervision signals used to compute candidate updates to adapter parameters. A supervision signal may be an explicit human correction such as an edited output or a preference selection, an implicit outcome such as a downstream task success or failure or a user rejection, or a signal from a verification module such as a schema validator pass or fail result, a unit test result, or a policy compliance check result. The supervision intake module constructs a supervised event record that may include a unique event identifier, a timestamp, tenant and user and session identifiers, the request input, the model output, the correction or target, the routing certificate, the supervision source type, tool context and logs if applicable, applicable policy context, and a context hash computed as a cryptographic hash over a canonicalized representation of relevant context elements.

When a supervision signal is available, the computing system computes a candidate update to the adapter state keyed to the routing certificate. The computing system computes a loss L_t for the supervised event according to the supervision type. For an explicit corrected output, the loss may be a negative log-likelihood or sequence loss between the model output and the corrected output. For a preference signal, the loss may be a pairwise preference loss. For a verifier pass or fail signal, the loss may be an auxiliary loss that encourages constraint satisfaction. The computing system computes a candidate gradient g_t as the gradient of L_t with respect to the adapter parameters phi_c associated with the routing certificate. Gradient computation may be performed immediately after the supervision signal is received, in a micro-batch of multiple supervised events, or asynchronously provided that the subsequent commit step remains consistent with transaction semantics and version ordering. A learning rate eta_t may be fixed within a session, scaled by confidence, decayed as cumulative drift increases, or set to a lower value for higher-risk routing certificates.

The computing system implements a gating policy module that evaluates whether to authorize committing the candidate update. The gating policy module computes or receives the following gating signals for each candidate update. A confidence measure conf_t may be derived from one or more of a calibrated probability or margin between top output candidates, an agreement metric between the model output and a verification module outcome, a consistency metric computed across multiple stochastic forward passes of the machine learning model, and a trust level associated with the supervision source such as a distinction between a privileged reviewer and an untrusted source. A risk measure risk_t may be derived from one or more of a safety classifier applied to the request and the intended update behavior, a policy engine evaluation of content or tool actions, and a certificate-based default risk threshold associated with the routing certificate. A scope eligibility check scope_ok_t produces a boolean value confirming that the routing certificate matches the adapter state key and that the adapter state is eligible for update under current configuration. A budget check budget_ok_t produces a boolean value confirming that a cumulative drift budget has not been exceeded. The budget check may evaluate one or more of a maximum number of committed updates within the session for the routing certificate, a maximum cumulative norm of committed delta updates, a maximum cumulative deviation of adapter parameters from the baseline adapter state, and a maximum per-layer delta magnitude.

The gating policy module applies a gating rule that authorizes the commit, producing a write decision of one, only when each of the following conditions is satisfied: the confidence measure meets a configured confidence threshold tau_conf, the risk measure satisfies a configured risk threshold tau_risk, the scope eligibility check returns true, and the budget check returns true. If any condition is not satisfied, the write decision is zero and the computing system refrains from modifying the adapter state. The confidence threshold, risk threshold, norm bound, trust region bound, and budget limits may each be configurable per routing certificate, enabling different adaptation policies for different context partitions. When the write decision is zero, the computing system may optionally log a denied-update record comprising a summary of the candidate update such as a gradient norm rather than full gradient values, the confidence measure, the risk measure, the scope eligibility result, the budget check result, and one or more reason codes identifying which conditions were not satisfied.

When the gating policy authorizes the commit, the computing system implements a projection and commit module that constrains the candidate update and commits the result. The projection and commit module applies a projection operator Pi to the candidate update to produce a constrained update. The projection operator may enforce one or more of the following constraints. A norm constraint limits the norm of the additive low-rank delta for each adapted transformation to at most a configured norm bound rho. To enforce the norm constraint, the projection and commit module computes the Frobenius norm of the low-rank delta DeltaW equal to A times B for each adapted transformation, and when the computed norm exceeds rho, rescales the factor matrices A and B by a ratio of rho to the computed norm. Alternatively, the projection and commit module may enforce an operator norm constraint using approximate power iteration for scaling. A structured sparsity constraint restricts the update to a subset of layers or parameter blocks specified in a configuration associated with the routing certificate, implemented by masking gradients to zero for layers not included in the allowed layer list. A trust region constraint limits the deviation of the adapter parameters from the session baseline adapter state phi_c_zero to at most a configured trust region bound delta, implemented by computing the deviation after applying the update and, when the deviation exceeds delta, scaling the update or projecting back onto the constraint boundary. When multiple constraints are enforced, the projection operator may apply the trust region constraint first and the per-layer norm constraint second, with the sparsity mask applied throughout. After projection, the projection and commit module commits the constrained update by adding the projected delta to the current adapter parameters, and the adapter manager increments the version index.

The computing system implements a transaction log and provenance module that records each committed update as a transaction in a versioned transaction log. Each transaction record includes a transaction identifier, the routing certificate, the adapter key including tenant and optional user and session identifiers, a base adapter version indicating the version prior to the commit, a new adapter version indicating the version after the commit, a pointer to or serialized representation of the delta update DeltaPhi_t, and provenance metadata. The provenance metadata includes at least a timestamp, a supervision source identifier indicating whether the supervision was from a human correction, a tool verification module, or an implicit outcome, the confidence measure and the confidence threshold applied, the risk measure and the risk threshold applied, the scope eligibility result, the budget check result, a context hash, a scope function version identifier, and a gating policy version identifier. The context hash may be a cryptographic hash computed over a canonicalized representation of the request input, the model output, the supervision signal, tool logs or verifier outputs if applicable, the routing certificate, and the scope function version. The versioned transaction log may be stored as an append-only log in a database, as an event stream in a message bus with durable storage, or as a file-based log with an index by adapter key and version. The transaction log supports audit queries including enumerating all committed updates for a given adapter key, reconstructing adapter state at any version, and retrieving the gating signals and thresholds that led to acceptance or denial of a particular update.

The adapter state at any version t is equal to the baseline adapter state phi_c_zero plus the sum of delta updates DeltaPhi_i for i from one through t. The computing system implements a rollback manager module that, responsive to a rollback instruction identifying a target version k, restores the adapter state by computing a prefix sum of delta updates from the baseline adapter state through version k using the versioned transaction log. Because only the adapter deltas change during online operation and the base parameters theta remain unmodified, rollback restores a prior operational adapted state without affecting the base parameters. A rollback instruction may be triggered by a safety violation detected after a commit, by regression tests failing, by a user complaint or explicit revert request, or by cumulative drift exceeding budget limits. To support efficient rollback over large transaction logs, the computing system may store periodic snapshots of the adapter state at version intervals, for example every fifty commits. When a rollback targets a version, the rollback manager may load a stored snapshot at or prior to the target version and then apply delta updates from the snapshot version through the target version, rather than recomputing from the baseline. The computing system may also cache the most recently reconstructed adapter states in memory and may store a Merkle-tree structure over deltas to support integrity verification.

The computing system implements a hypothesis memory module that supports controlled promotion of validated adapter states into durable knowledge representations. The hypothesis memory module identifies a validated adapter version for a routing certificate based on one or more validation criteria. The validation criteria may include repeated success across multiple supervised events, acceptance by a verification module such as a schema validator or policy compliance checker, approval from a privileged human reviewer, and absence of regressions on a small evaluation set. Upon identifying a validated adapter version, the hypothesis memory module constructs a structured hypothesis record. The structured hypothesis record includes a hypothesis identifier, the routing certificate, an adapter version identifier corresponding to the validated adapter version, a structured convention describing at least one learned behavior, provenance links comprising identifiers of transaction records in the versioned transaction log that support the hypothesis, and an activation policy specifying conditions under which the hypothesis is to be applied in subsequent sessions. The structured convention may describe a schema identifier or template identifier, a formatting rule, an abbreviation mapping, a tool usage constraint, or another learned behavioral pattern. The structured hypothesis record may further include a validation evidence summary, a creation timestamp, and an expiry or review schedule. The hypothesis memory module stores the structured hypothesis record in a hypothesis memory log.

In a subsequent session associated with the same routing certificate, the computing system may select an adapter state corresponding to the routing certificate and the adapter version identifier of a stored structured hypothesis record, and apply the selected adapter state to the machine learning model during inference without overwriting the base parameters. The activation policy may specify that the hypothesis is applied when the routing certificate of the subsequent session matches the routing certificate of the hypothesis, or may specify additional conditions such as a tenant match or a minimum confidence threshold. The hypothesis memory log provides a durable, auditable record of validated learning linked to specific adapter versions and the transaction history that produced them, supporting reuse of validated adaptations across sessions while maintaining separation from the base parameters.

Optionally, the computing system may perform an offline consolidation process that distills behaviors associated with validated adapter versions into a slow-update adapter bank or into the base parameters theta. The offline consolidation process operates outside the in-session update path and is gated by stricter evaluation criteria than the criteria applied to in-session delta updates. Consolidation inputs may include adapter states, transaction logs, hypothesis records, and validation evidence, along with offline evaluation tasks. Consolidation outputs may include updated base parameters or an updated slow adapter bank and an audit report linking consolidation changes to hypotheses and supporting evidence.

The following paragraphs describe example deployment scenarios that illustrate operation of the disclosed system across different application contexts.

In an enterprise assistant deployment, the routing certificate may encode a domain and tool-permission context such as finance read-only or legal tool-enabled. A supervised event may arrive when a privileged reviewer corrects formatting and terminology in a model output. The gating policy module evaluates whether the supervision source has a high trust level, whether the risk measure is below the threshold for the applicable domain, whether the routing certificate matches the adapter state, and whether the session drift budget has not been exceeded. When authorized, the committed update applies only to the adapter state associated with the routing certificate, and adaptations do not affect model behavior when the model operates under other routing certificates. If a subsequent audit determines that a learned convention is incorrect or unsafe, the rollback manager restores the adapter state to a prior version. Validated conventions such as a report template and an abbreviation list may be promoted as structured hypothesis records linked to the adapter version and reused in future sessions.

In a tutoring system deployment, the routing certificate may encode a subject and grade level such as introductory algebra. A supervision signal may arrive when a learner repeatedly demonstrates a misconception and the tutor system adjusts its explanation approach. The gating policy module may require repeated confirmation across multiple supervised events before authorizing a commit, to reduce the risk of learning from noise. Trust region constraints limit deviation from the baseline teaching competence. The hypothesis memory module may store a structured record describing the misconception pattern and a preferred corrective explanation style, linked to the adapter version that produced the adaptation.

The modules described above, including the adapter manager, the scope and certificate module, the supervision intake module, the gating policy module, the projection and commit module, the transaction log and provenance module, the rollback manager, and the hypothesis memory module, may each be implemented as a software component, a microservice, a library, or a combination of these. The modules may execute on a single computing device or may be distributed across multiple computing devices communicating over a network. A person of ordinary skill in the art will recognize that the disclosed modules may be combined, further separated, or rearranged while preserving the described operational behavior.

Various implementations of the invention involve the technical field of runtime control architectures that govern parameter updates to a deployed machine learning model including maintaining, by a computing system comprising one or more processors, a versioned transaction log of delta updates for an adapter state associated with a machine learning model, wherein each delta update in the versioned transaction log is associated with a routing certificate, a version index, and provenance metadata, and wherein the adapter state is applied to the machine learning model as additive low-rank deltas to at least one transformation without modifying base parameters of the machine learning model; identifying, based on one or more validation criteria, a validated adapter version for the routing certificate, wherein the one or more validation criteria comprise at least one of: repeated success across multiple supervised events, acceptance by a verification module, approval from a privileged human reviewer, and absence of regressions on an evaluation set; constructing a structured hypothesis record comprising: a hypothesis identifier, the routing certificate, an adapter version identifier corresponding to the validated adapter version, a structured convention describing at least one learned behavior, provenance links comprising identifiers of transaction records in the versioned transaction log that support the structured hypothesis record, and an activation policy specifying conditions under which the structured hypothesis record is to be applied in subsequent sessions; and storing the structured hypothesis record in a hypothesis memory log; and in a subsequent session associated with the routing certificate, selecting an adapter state corresponding to the routing certificate and the adapter version identifier of the stored structured hypothesis record, and applying the selected adapter state to the machine learning model during inference without overwriting the base parameters and are therefore necessarily rooted in computer technology. For example, the aforementioned steps are inherently computer-based and cannot be performed in the human mind. The present invention amounts to more than merely implementing the generic computer as a tool to gather, analyze, and output data because the steps of the present method, system, or product improve the field of runtime control architectures that govern parameter updates to a deployed machine learning model by permitting a model to update its own parameters during live operation without uncontrolled drift, cross-context contamination, or loss of the ability to restore a prior known-good state. Conventional systems either update parameters globally without runtime authorization controls, store information in external memory without modifying learned representations, or apply post-processing rules that do not alter model behavior at the parameter level. The disclosed system addresses these limitations through a specific, integrated control-flow architecture operating within the parameter-write path of the machine learning model itself. The gating policy module does not merely implement a human approval workflow mapped onto a computer; it computes machine-derived signals, calibrated confidence measures from model outputs, risk scores from safety classifiers, scope eligibility from certificate matching, and cumulative drift metrics from adapter parameter norms, and uses those signals to make a real-time authorization decision at the point of parameter commit. The projection and commit module enforces mathematical constraints (norm bounds, structured sparsity, trust regions) on the delta update before it is written, which are operations on the internal state of the computing system that have no analog in human activity. The transaction log and provenance module records each committed delta with machine-generated metadata and version indices that enable the rollback manager to deterministically reconstruct any prior adapter state through prefix-sum computation over logged deltas, a concrete algorithmic operation on data structures maintained by the system. As illustrated in the figures, data flows from supervision intake through candidate update computation, gating evaluation, projection, commit, and transactional logging in an automated pipeline where each module operates on machine-internal state artifacts (adapter parameters, routing certificates, delta records, version indices) rather than organizing decisions among human actors. The system improves the functioning of the computing system itself by providing deterministic reversibility of model state, bounded parameter drift, and scope-isolated adaptation during runtime operation.

Additionally, the steps of the present invention would be impossible to accomplish on pen and paper due to the volume of data being communicated and received over a network in real-time. In particular, the speed at which the steps of the present invention occur to effectuate the disclosed method, system, or product would involve large-scale, continuous wireless communication of such data. That is, the steps of the present method, system, or product are impossible to accomplish on pen and paper, cannot be accomplished as a method of organizing human activity, and amount to significantly more than merely gathering, analyzing, and outputting data.

Implementations of the present invention include implementing (executing, running, or deploying) one or more artificial intelligence models on a computing device wherein the computing device executes the artificial intelligence model's algorithms and mathematical functions on computer hardware using machine learning libraries. The computing device implements the artificial intelligence model when it performs tasks like training, making predictions, applying the model to data, decision-making, classification, or generating outputs based on inputs. In particular, the speed at which an artificial intelligence model analyzes and transforms data to effectuate the disclosed method, system, or product would involve large-scale, continuous transformation of such data. As such, the present invention would be impossible to accomplish on pen and paper or in the human mind due to the volume of data being analyzed and transformed by the artificial intelligence model.

FIG. 1 illustrates a computing system comprising one or more processors 102 and one or more non-transitory computer-readable storage media 100. The computing system receives a request 20 and a context 22. A scope function sigma 132 applies to at least one of the request 20 and the context 22 to produce a routing certificate 134. The routing certificate 134 is a discrete identifier representing a context partition, and the computing system logs an inference record 27 that associates the routing certificate 134 with a version index 24.

The computing system operates a machine learning model 110 comprising base parameters stored in a world model store 114. The machine learning model 110 includes one or more transformations W to which adapter parameters are applied. An adapter manager module 122 stores adapter parameters phi 122 and maintains an adapter state 126 keyed to the routing certificate 134. The adapter state 126 includes a baseline index 128 representing the baseline adapter state phi_c_zero for the session. The adapter manager module 122 applies the adapter state 126 to the machine learning model 110 as additive low-rank deltas, where each adapted transformation produces an output 26 computed as the product of W plus the product of factor matrices A **124*a* and B 124*b*, parameterized with rank r significantly smaller than the transformation dimensions. The factor matrices A 124*a* having dimensions d_out by r and B 124*b* having dimensions r by d_in together define the low-rank delta DeltaW applied to the transformation W, and the adapted output u_w 26** is produced during inference.

A supervision intake module 140 receives supervision signals and constructs supervised event records. The supervision intake module 140 computes a candidate update 142 to the adapter state 126 keyed to the routing certificate 134 by computing a gradient of a loss function with respect to the adapter parameters associated with the routing certificate.

The computing system evaluates gating signals 144 comprising a confidence measure conf_t, a risk measure risk_t, a scope eligibility check scope_ok_t, and a budget check budget_ok_t. A gating policy module 153 receives the gating signals 144 and applies a gating rule with configured thresholds 154 including scope_ok_t required and a scope eligibility rule 154. The gating policy module 153 produces a write decision that authorizes committing the candidate update only when each of the confidence measure, the risk measure, the scope eligibility check, and the budget check is satisfied.

When the gating policy module 153 authorizes the commit, a projection and commit module 160 receives the candidate update and applies a projection operator to produce a constrained update 164. The projection operator enforces one or more constraints selected from a norm constraint, a structured sparsity constraint, and a trust region constraint relative to the baseline adapter state. The projection and commit module 160 commits the constrained update 164 to the adapter state 126 and increments the version index 24.

A transaction log and provenance module 170 appends a transaction record 174 to a versioned transaction log 182. Each transaction record 174 includes the routing certificate, the delta update corresponding to the constrained update, and provenance metadata comprising at least a timestamp, a supervision source identifier, the confidence measure, the risk measure, and a context hash. The versioned transaction log 182 stores transaction records 174 in an append-only structure that supports audit queries and deterministic state reconstruction.

A rollback manager module 190 receives a rollback instruction and restores the adapter state to a target version by computing a prefix sum of delta updates from the baseline adapter state through the target version using the versioned transaction log 182, without modifying the base parameters stored in the world model store 114. The rollback manager module 190 may use snapshots 194 stored at periodic version intervals to accelerate restoration by loading a snapshot at or prior to the target version and applying delta updates from the snapshot version through the target version. The rollback manager module 190 also receives an instruction record 194 specifying the target version and authorization for the rollback.

A hypothesis memory module 180 validates adapter versions based on validation criteria and stores structured hypothesis records in a hypothesis memory log 184. The hypothesis memory module 180 identifies a validated adapter version for a routing certificate and constructs a structured hypothesis record comprising a hypothesis identifier, the routing certificate, an adapter version identifier, a structured convention, provenance links to transaction records in the versioned transaction log 182, and an activation policy. In subsequent sessions, the computing system may select an adapter state corresponding to a stored hypothesis record and apply the selected adapter state during inference without overwriting the base parameters.

An optional offline consolidation module 40 may distill behaviors from validated adapter versions into base parameters 112 or into a slow-update adapter bank 42. The offline consolidation module 40 operates outside the in-session update path and is gated by stricter evaluation criteria than those applied to in-session delta updates. The offline consolidation module 40 receives adapter states and hypothesis records as inputs and produces updated base parameters or a slow-update adapter bank along with an audit report linking changes to supporting hypotheses and evidence. The base parameters, validated adapter versions, and slow-update adapter bank 42 may optionally be updated through this offline consolidation pathway 41.

Figure 2:
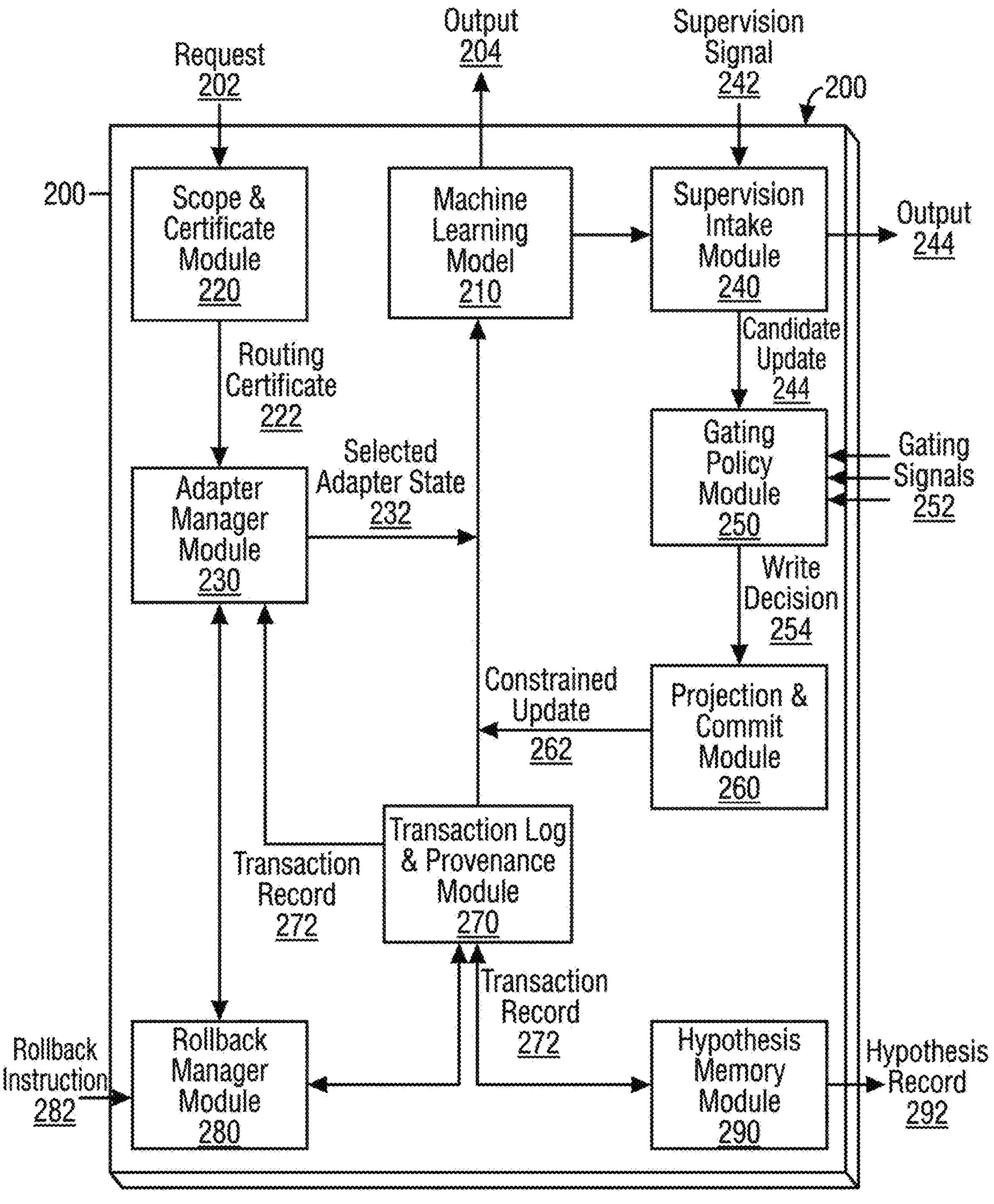
FIG. 2 is a module interaction diagram illustrating data flow among the scope and certificate module, the machine learning model, the adapter manager module, the supervision intake module, the gating policy module, the projection and commit module, the transaction log and provenance module, the rollback manager module, and the hypothesis memory module within the computing system.

FIG. 2 illustrates the data flow among modules within the computing system 200. A request 202 is received by the scope and certificate module 220, which applies the scope function to produce a routing certificate 222. The adapter manager module 230 receives the routing certificate 222 and selects an adapter state 232 keyed to the routing certificate. The machine learning model 210 receives the selected adapter state 232 from the adapter manager module 230 and produces an output 204 using the base parameters and the selected adapter state 232.

A supervision signal 242 is received by the supervision intake module 240, which also receives the output 244 produced by the machine learning model 210. The supervision intake module 240 constructs a supervised event record and computes a candidate update 244 to the adapter state keyed to the routing certificate.

The gating policy module 250 receives the candidate update 244 and gating signals 252 comprising a confidence measure, a risk measure, a scope eligibility check, and a budget check. The gating policy module 250 evaluates the gating rule and produces a write decision 254. When the write decision 254 authorizes the commit, the projection and commit module 260 receives the candidate update and applies the projection operator to produce a constrained update 262. The constrained update 262 is committed to the adapter state in the adapter manager module 230, which updates the adapter state and increments the version index.

The transaction log and provenance module 270 receives the constrained update and produces a transaction record 272 that is appended to the versioned transaction log. Each transaction record 272 includes the routing certificate, the delta update, and provenance metadata.

The rollback manager module 280 receives a rollback instruction 282 and accesses transaction records 272 from the transaction log and provenance module 270 to restore the adapter state to a target version by computing a prefix sum of delta updates from the baseline adapter state, and updates the adapter state in the adapter manager module 230 without modifying the base parameters in the machine learning model 210.

The hypothesis memory module 290 accesses transaction records 272 from the transaction log and provenance module 270, validates adapter versions based on validation criteria, and produces a hypothesis record 292. The hypothesis record 292 comprises a structured convention linked to a validated adapter version identifier and provenance links to supporting transaction records.

Figure 3:
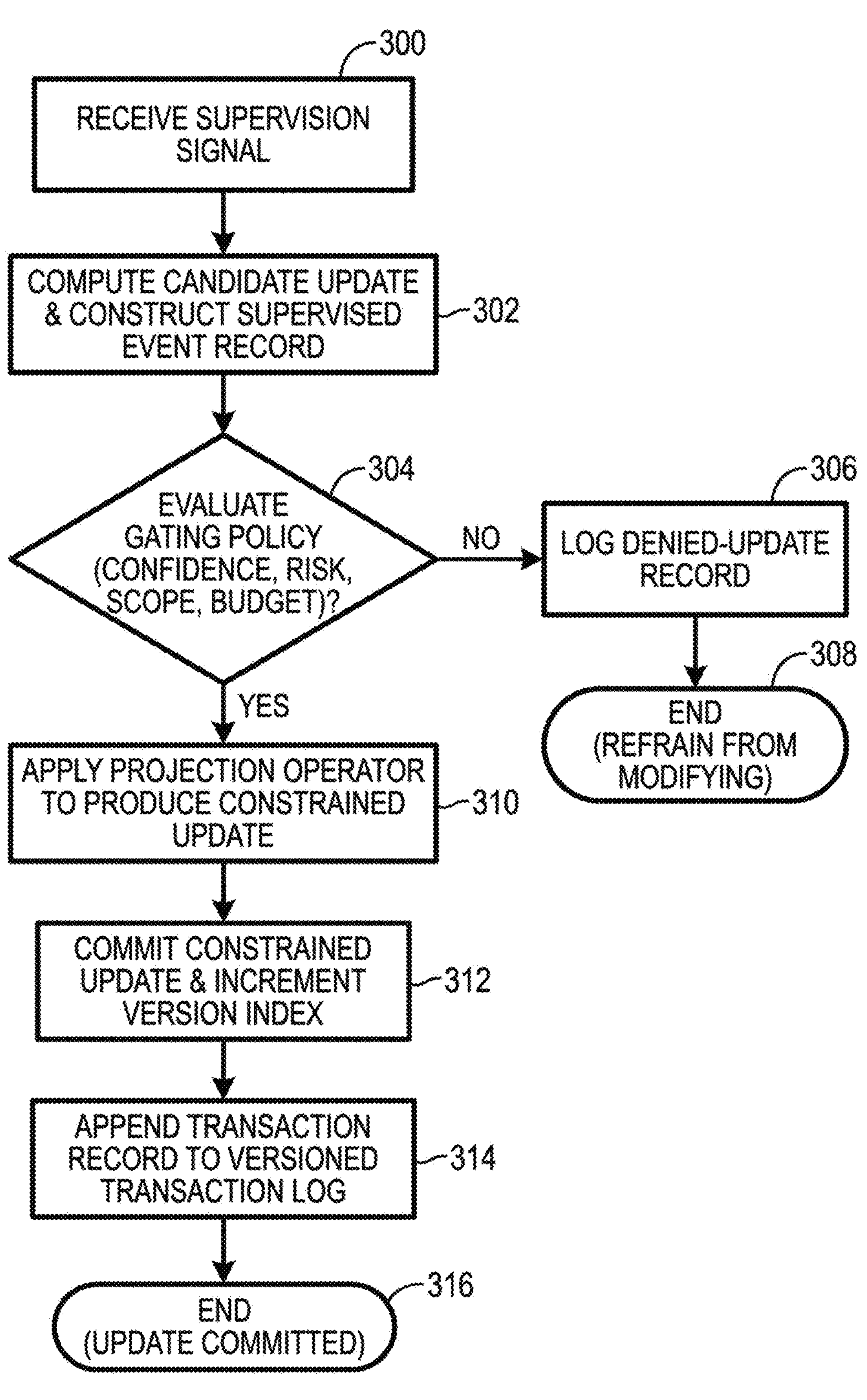
FIG. 3 is a flowchart illustrating a method for processing a supervision signal, evaluating a gating policy, and either committing a constrained update with a transaction record or refraining from modifying the adapter state and logging a denied-update record.

FIG. 3 illustrates a method 300 for processing a supervision signal and committing or denying an adapter update. At step 300, the computing system receives a supervision signal. At step 302, the computing system computes a candidate update and constructs a supervised event record comprising the request input, the model output, the correction or target, the routing certificate, and provenance inputs. At decision step 304, the computing system evaluates the gating policy by determining whether the confidence measure meets the confidence threshold, the risk measure satisfies the risk threshold, the scope eligibility check confirms update eligibility, and the budget check confirms that cumulative drift remains within limits. When the gating policy does not authorize the commit, indicated by the NO path, the computing system logs a denied-update record at step 306, and the method ends at step 308 with the computing system refraining from modifying the adapter state. When the gating policy authorizes the commit, indicated by the YES path, the computing system applies the projection operator to the candidate update to produce a constrained update at step 310. At step 312, the computing system commits the constrained update to the adapter state and increments the version index. At step 314, the computing system appends a transaction record to the versioned transaction log, the transaction record comprising the routing certificate, the delta update, and provenance metadata. The method ends at step 316 with the update committed.

Figure 4:
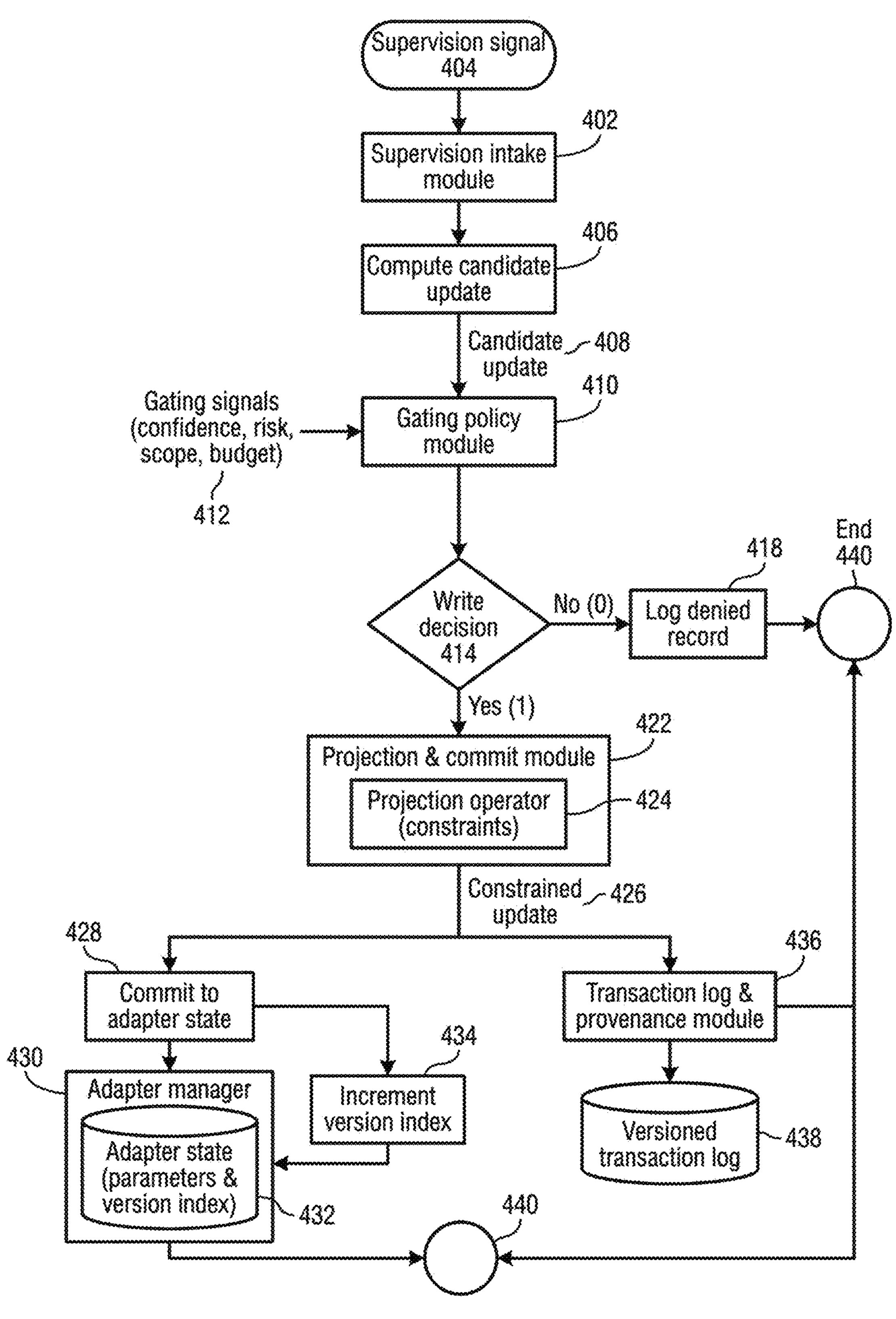
FIG. 4 is a detailed data flow diagram illustrating the sequence of operations from receipt of a supervision signal through supervision intake, candidate update computation, gating policy evaluation, write decision, projection and commit, adapter state update with version index increment, and transaction log append.

FIG. 4 illustrates a detailed data flow 400 for the update authorization and commit sequence. A supervision signal 404 is received by the supervision intake module 402. The supervision intake module 402 computes a candidate update at step 406, producing a candidate update 408. The candidate update 408 is received by the gating policy module 410, which also receives gating signals 412 comprising a confidence measure, a risk measure, a scope eligibility check, and a budget check. The gating policy module 410 produces a write decision 414. When the write decision 414 is No, indicated by a value of zero, the computing system logs a denied record at step 418, and the method ends at step 440. When the write decision 414 is Yes, indicated by a value of one, the projection and commit module 422 receives the candidate update and applies a projection operator with constraints at step 424 to produce a constrained update 426. The constrained update 426 is committed to the adapter state at step 428 in the adapter manager 430, which stores the adapter state comprising updated parameters and a version index 432. The version index is incremented at step 434. The transaction log and provenance module 436 receives the constrained update and appends a transaction record to the versioned transaction log 438. The method ends at step 440.

Figure 5:
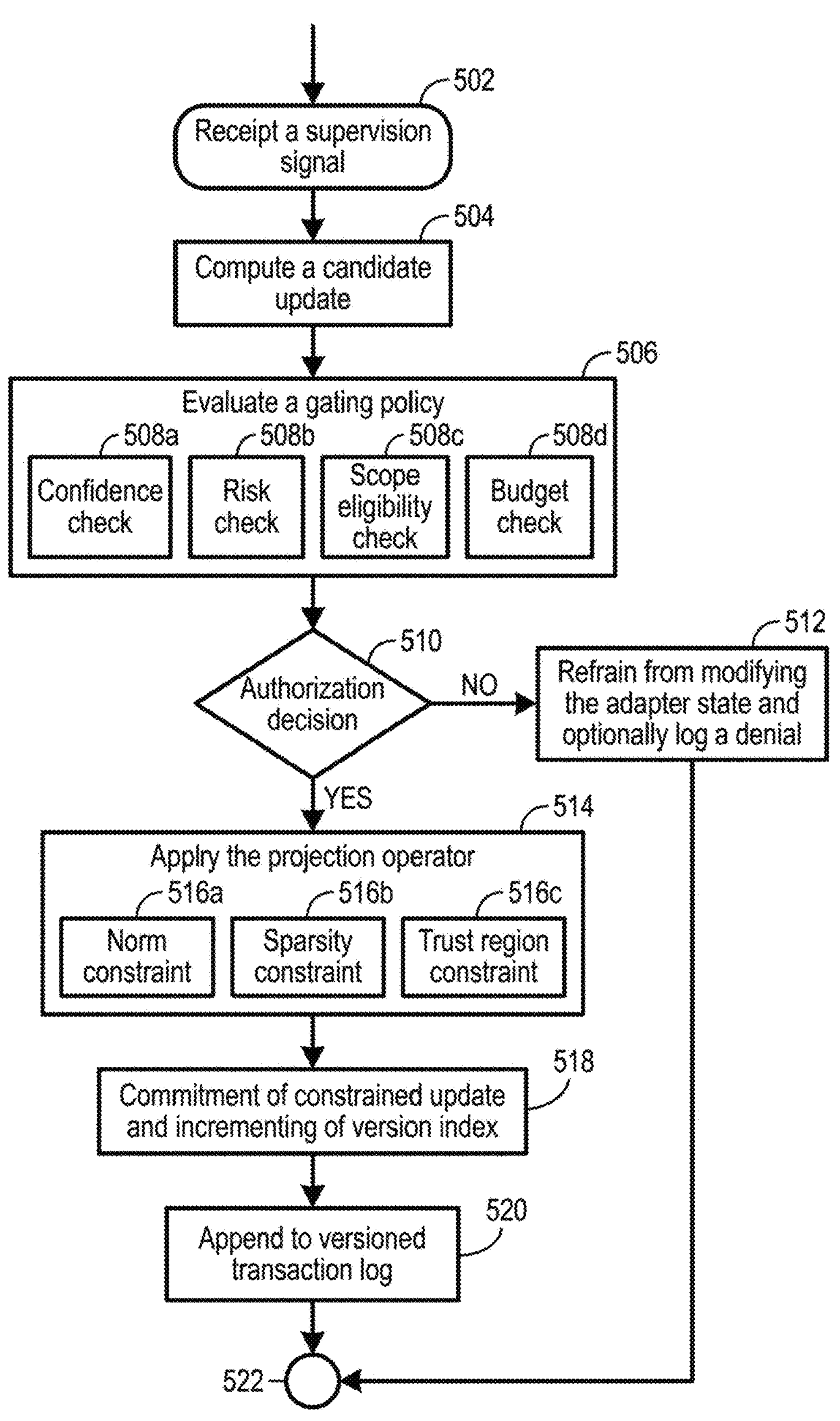
FIG. 5 is a flowchart illustrating a method for receiving a supervision signal, computing a candidate update, evaluating a gating policy comprising a confidence check, a risk check, a scope eligibility check, and a budget check, and upon authorization, applying a projection operator comprising a norm constraint, a sparsity constraint, and a trust region constraint, committing the constrained update, incrementing a version index, and appending to a versioned transaction log.

FIG. 5 illustrates a method 500 for receiving a supervision signal, evaluating the gating policy, applying the projection operator, and committing the constrained update. At step 502, the computing system receives a supervision signal. At step 504, the computing system computes a candidate update to the adapter parameters from the supervision signal. At step 506, the computing system evaluates a gating policy comprising four checks. A confidence check **508*a* determines whether the confidence measure meets the configured confidence threshold. A risk check 508*b* determines whether the risk measure satisfies the configured risk threshold. A scope eligibility check 508*c* determines whether the routing certificate matches the adapter state and is eligible for update. A budget check 508*d* determines whether cumulative drift of the adapter parameters from the session baseline remains within the configured limit. At decision step 510, the computing system produces an authorization decision. When the authorization decision is NO, the computing system refrains from modifying the adapter state and optionally logs a denial at step 512. When the authorization decision is YES, the computing system applies the projection operator at step 514. The projection operator comprises a norm constraint 516*a* that limits the norm of the low-rank delta to at most a configured norm bound, a sparsity constraint 516*b* that restricts the update to a subset of layers or parameter blocks specified in a configuration associated with the routing certificate, and a trust region constraint 516*c* that limits deviation of the adapter parameters from the session baseline to at most a configured trust region bound. At step 518, the computing system commits the constrained update to the adapter state and increments the version index. At step 520, the computing system appends a transaction record to the versioned transaction log, the transaction record comprising the routing certificate, the projected delta update, and provenance metadata. The method ends at step 522**.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrases "computing device" or "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

It will be appreciated by persons skilled in the art that the present embodiment is not limited to what has been particularly shown and described hereinabove. A variety of modifications and variations are possible considering the above teachings without departing from the following claims.

I claim:

1. A computing system comprising one or more processors and one or more non-transitory computer-readable storage media storing instructions that, when executed by the one or more processors, cause the computing system to:

receive a request and determine a routing certificate by applying a scope function to at least one of the request and a context associated with the request, wherein the routing certificate is a discrete identifier representing a context partition;

generate an output using a machine learning model comprising base parameters and adapter parameters, wherein an adapter state keyed to the routing certificate is applied as an additive low-rank delta to at least one transformation of the machine learning model, and wherein adapter states keyed to routing certificates other than the determined routing certificate are not applied to the at least one transformation during generation of the output;

receive a supervision signal associated with the request and the output, and compute a candidate update to the adapter state keyed to the routing certificate;

evaluate a gating policy to determine whether to authorize committing the candidate update, wherein the gating policy authorizes committing the candidate update only when each of the following conditions is satisfied: (i) a confidence measure meets a confidence threshold, (ii) a risk measure satisfies a risk threshold, (iii) a scope eligibility check confirms that the routing certificate matches the adapter state and is eligible for update, and (iv) a budget check confirms that a cumulative drift budget for the adapter state has not been exceeded;

when the gating policy does not authorize committing the candidate update, refrain from modifying the adapter state;

when the gating policy authorizes committing the candidate update, apply a projection operator to the candidate update to produce a constrained update, commit the constrained update to the adapter state, and increment a version index associated with the adapter state;

append, to a versioned transaction log, a transaction record comprising at least the routing certificate, a delta update corresponding to the constrained update, provenance metadata comprising a timestamp, a supervision source identifier, the confidence measure, the risk measure, and a context hash, and the version index; and responsive to a rollback instruction identifying a target version, restore the adapter state to the target version by computing a prefix sum of delta updates from a baseline adapter state through the target version using the versioned transaction log, without modifying the base parameters of the machine learning model.

2. The computing system of claim 1, wherein the additive low-rank delta for each adapted transformation W having dimensions d_out by d_in is parameterized as a product of a first factor matrix A having dimensions d_out by r and a second factor matrix B having dimensions r by d_in, where r is less than each of d_out and d_in.

3. The computing system of claim 1, wherein applying the adapter state during generation of the output comprises computing, for each adapted transformation W, a sum of a product of W and an input vector u and a product of A, B, and the input vector u, without materializing an adapted weight matrix.

4. The computing system of claim 1, wherein the scope function is implemented as one of: a deterministic rules engine with explicit versioning, a classifier model producing discrete labels, or a hybrid system in which rules override classifier outputs, and wherein the instructions further cause the computing system to log at least inputs to the scope function and the routing certificate output for each request.

5. The computing system of claim 1, wherein the adapter state is keyed by a composite key comprising the routing certificate and at least one additional identifier selected from: a tenant identifier, a user identifier, an application identifier, and a session identifier.

6. The computing system of claim 1, wherein the confidence measure is derived from at least one of: a calibrated probability of the output, an agreement metric between the output and a verification module outcome, a consistency metric across multiple stochastic forward passes of the machine learning model, and a trust level associated with the supervision source.

7. The computing system of claim 1, wherein the risk measure is derived from at least one of: a safety classifier applied to the request and the candidate update, a policy engine evaluation, and a certificate-based default risk threshold associated with the routing certificate.

8. The computing system of claim 1, wherein the budget check evaluates at least one of: a maximum number of committed updates within a session for the routing certificate, a maximum cumulative norm of committed delta updates, a maximum cumulative deviation from the baseline adapter state, and a maximum per-layer delta magnitude.

9. The computing system of claim 1, wherein the instructions further cause the computing system to, when the gating policy does not authorize committing the candidate update, log a denied-update record comprising at least a summary of the candidate update, the confidence measure, the risk measure, a scope eligibility result, a budget check result, and one or more reason codes for denial.

10. The computing system of claim 1, wherein restoring the adapter state to the target version further comprises:

loading a stored snapshot of the adapter state at a snapshot version that is at or prior to the target version; and applying delta updates from the versioned transaction log from the snapshot version through the target version to reconstruct the adapter state at the target version.

11. A computer-implemented method comprising:

receiving, by a computing system comprising one or more processors operating a machine learning model having base parameters and adapter parameters applied as additive low-rank deltas, a candidate delta update to the adapter parameters, wherein the candidate delta update is computed from a supervision signal received during runtime operation of the machine learning model;

evaluating a gating policy that authorizes committing the candidate delta update only when: (i) a confidence measure satisfies a configured confidence threshold, (ii) a risk measure satisfies a configured risk threshold, (iii) a scope eligibility check associated with a routing certificate confirms update eligibility, and (iv) a budget check confirms that cumulative drift of the adapter parameters from a session baseline remains within a configured limit;

when the gating policy authorizes committing the candidate delta update, applying a projection operator to the candidate delta update to produce a projected delta update, wherein the projection operator enforces at least one constraint selected from:

a norm constraint that limits a norm of the additive low-rank delta for each adapted transformation to at most a configured norm bound, a structured sparsity constraint that restricts the candidate delta update to a subset of layers or parameter blocks specified in a configuration associated with the routing certificate, and a trust region constraint that limits deviation of the adapter parameters from the session baseline to at most a configured trust region bound;

committing the projected delta update to the adapter parameters without modifying the base parameters; and appending to a versioned transaction log a transaction record comprising the routing certificate, the projected delta update, provenance metadata comprising at least a timestamp, a supervision source identifier, the confidence measure, and the risk measure, and a version index, wherein the versioned transaction log and a baseline adapter state together enable deterministic restoration of the adapter parameters to any previously committed version by computing a prefix sum of delta updates from the baseline adapter state.

12. The computer-implemented method of claim 11, wherein the norm constraint is enforced by computing a Frobenius norm of the additive low-rank delta for each adapted transformation and, when the Frobenius norm exceeds the configured norm bound, rescaling factor matrices of the additive low-rank delta by a ratio of the configured norm bound to the computed Frobenius norm.

13. The computer-implemented method of claim 11, wherein applying the projection operator comprises applying the trust region constraint prior to applying the norm constraint.

14. The computer-implemented method of claim 11, wherein the configured confidence threshold, the configured risk threshold, the configured norm bound, and the configured trust region bound are each configurable per routing certificate.

* * * * *